United States Patent [19]

Sheahan

[11] Patent Number: 4,954,038

[45] Date of Patent: Sep. 4, 1990

[54] TWO-TIER STORAGE RACK FOR VEHICLES

[76] Inventor: Thomas H. Sheahan, 2389 W. Rawson Ave., Oak Creek, Wis. 53154

[21] Appl. No.: 381,308

[22] Filed: Jul. 18, 1989

[51] Int. Cl.$^5$ .............................................. B60P 3/08
[52] U.S. Cl. .................................. 414/482; 414/538; 414/494
[58] Field of Search ............... 414/480, 482, 483, 484, 414/494, 495, 538, 569, 571, 573, 575

[56] References Cited

U.S. PATENT DOCUMENTS

| | | | |
|---|---|---|---|
| 3,677,425 | 7/1972 | Patten | 414/538 |
| 3,870,339 | 3/1975 | Goff | 414/495 X |
| 3,902,613 | 9/1975 | Newland | 414/538 |
| 4,068,772 | 1/1978 | Prudhomme | 414/480 X |
| 4,469,346 | 9/1984 | Low | 414/495 X |
| 4,589,814 | 5/1986 | Cates | 414/484 |
| 4,749,317 | 6/1988 | Daniel | 414/538 X |
| 4,784,545 | 11/1988 | Lawrence | 414/482 X |

Primary Examiner—Robert J. Spar
Assistant Examiner—John VandenBosche
Attorney, Agent, or Firm—Andrus, Sceales, Starke & Sawall

[57] ABSTRACT

A portable and easily maneuverable two-tier storage rack for snowmobiles and the like includes a generally rectangular open framework including a lower horizontal frame member and an upper support platform, both of which are adapted to support a snowmobile, one above the other. The upper vehicle support platform is pivotally connected at one end to the upper portion of the framework between a downwardly inclined loading position in which position a snowmobile may be pulled upwardly onto the inclined platform and an upper storage position in which the other free end of the platform is raised to carry the snowmobile to an upper horizontal position. A second snowmobile may then be pulled onto the lower horizontal frame member for storage directly below the upper snowmobile. A first winch mounted on the rear of the storage rack is utilized to sequentially pull the first and second snowmobiles onto their respective supporting platforms. A second winch mounted on the forward end of the rack is utilized to raise the upper support platform and the snowmobile thereon from the inclined loading position to the raised generally horizontal storage position. Alternately, the second winch may be eliminated and the first winch also utilized to provide the platform lifting operation. Maneuverability of the storage rack, both for positioning the rack adjacent the snowmobiles to be loaded and for moving the rack within a storage facility, is enhanced by providing supporting casters at the lower corners of the framework.

16 Claims, 2 Drawing Sheets

TWO-TIER STORAGE RACK FOR VEHICLES

BACKGROUND OF THE INVENTION

The present invention pertains to a storage apparatus for small vehicles and, in particular, to a two-tier rack for the serial storage of vehicles such as snowmobiles.

Small vehicles, such as snowmobiles, create significant storage and handling problems when maintained in large numbers, such as in manufacturer or dealer storage. Also, owners often store more than one snowmobile in a garage or the like, thereby requiring the use of valuable storage area. Similar problems arise with respect to the storage and maintenance of small wheeled vehicles, such as all terrain vehicles. However, the problems associated with snowmobiles are somewhat more acute because, without wheels, snowmobiles are difficult to move and maneuver in storage. Snowmobiles are also typically difficult to service and repair when in their normal position on the floor. This is particularly true with respect to repair or service of the drive track which can only be adequately accomplished by raising the vehicle off the floor.

U.S. Pat. No. 3,747,778 discloses a snowmobile hoist adapted to raise a snowmobile off the floor to provide ready access for repair or servicing. In particular, the hoist is intended to provide better accessibility to the endless drive track which, as indicated, is difficult to service when the snowmobile is on the floor. The apparatus utilizes a cradle adapted to hold the nose of the vehicle and to slide along upwardly inclined tracks. The rear of the vehicle is supported on a sling which is raised by a winch, causing the nose of the snowmobile to simultaneously slide upwardly along the inclined rails to expose the undercarriage and track for repair or servicing. The hoist is mounted on casters so it can be easily moved about for positioning and, if desired, temporary storage. However, the hoist is adapted to handle only a single snowmobile and requires the same amount of storage space as a single snowmobile itself.

Various types of apparatus are known in the art for the two-tiered vertical storage of automobiles. U.S. Pat. No. 3,941,257 discloses an inclined ramp onto which an automobile is initially driven. The inclined ramp is subsequently raised by a powered winch to an upper horizontal position during which both ends of the ramp are translated vertically, the lower end by a greater amount than the upper, such that in its fully raised position the ramp is essentially horizontal. The space beneath the ramp in its upper position provides room for parking a second car. The apparatus is complex, requires the ability of both vehicles to be driven into position under their own power, and is intended to be used as a permanent installation.

U.S. Pat. No. 3,387,722 discloses a somewhat similar apparatus for parking two vehicles in a vertical arrangement. The first vehicle is driven up a slightly inclined ramp which is subsequently raised vertically and tilted to the horizontal to position the ramp and first vehicle in an upper location. A second vehicle is then driven underneath the first. This apparatus also requires both vehicles to be driven under their own power onto the inclined ramp and under the raised ramp, respectively.

U.S. Pat. No. 3,270,898 discloses a two tier car parking arrangement in which a detachable inclined ramp includes rollers which are driven by the drive wheels of the vehicle and cooperate with rails on the ramp to drive the vehicle up to an elevated position. The ramp is then removed and the second vehicle is driven under the first. Like the other automobile storage apparatus previously described, this apparatus requires both vehicles to be driven thereon under their own power.

It would be desirable to have a two tiered storage apparatus for small vehicles of simple, lightweight construction, onto which the vehicles could be easily positioned without being driven thereon, which could be utilized to provide better access to the vehicles for servicing, and which storage unit could be moved and repositioned with the vehicles thereon. The storage unit should also be capable of handling different types of vehicles, including snowmobiles, all terrain vehicles and water jet skis.

SUMMARY OF THE INVENTION

In accordance with the present invention, there is provided a two tier storage rack for small vehicles, particularly snowmobiles, which provides compact vertical storage for two vehicles, can be operated by a single person, allows the vehicle to be positioned for ready access for servicing, and can be moved when fully loaded to optimize its storage capability.

The rack includes a generally rectangular open framework including a lower horizontal frame member adapted to support a vehicle. An upper vehicle support platform overlies the horizontal frame member and has a pivotal connection at one end to the upper portion of the framework. The upper support platform can be pivoted between an inclined loading position with its free opposite end adjacent the lower horizontal frame member and an upper storage position with the free end of the platform raised to the upper portion of the framework. Positioning means, which is preferably manually operable, is mounted on the framework for pulling a first vehicle onto the upper support platform in the inclined loading position, raising the platform and the first vehicle to the generally horizontal upper storage position by causing the platform to pivot about its pivotal connection, and then pulling a second vehicle onto the lower horizontal frame member beneath the first vehicle.

The positioning means preferably comprises a pair of winches attached to the opposite ends of the framework. The first winch includes a cable which is attachable by its free end sequentially to one end of each of said first and second vehicles to, respectively, pull a vehicle up the support platform in its inclined loading position and to pull a vehicle onto the lower horizontal frame member. The second winch includes a cable which is attachable to the free end of the upper support platform, whereby the platform can be raised to its upper storage position after the first vehicle is loaded theron and before the second vehicle is pulled onto the lower horizontal frame member.

The winch cables are preferably operated over appropriately positioned pulleys to allow optimal positioning of the winch operators. With an alternate pulley arrangement, the two winch system of the preferred embodiment may be replaced by a single winch. The storage rack includes pairs of supporting wheels or casters at its front and rear ends to facilitate maneuverability and enhanced storage capability.

DETAILED DESCRIPTION OF THE PREFERRED EMBODIMENT

Figure 1:
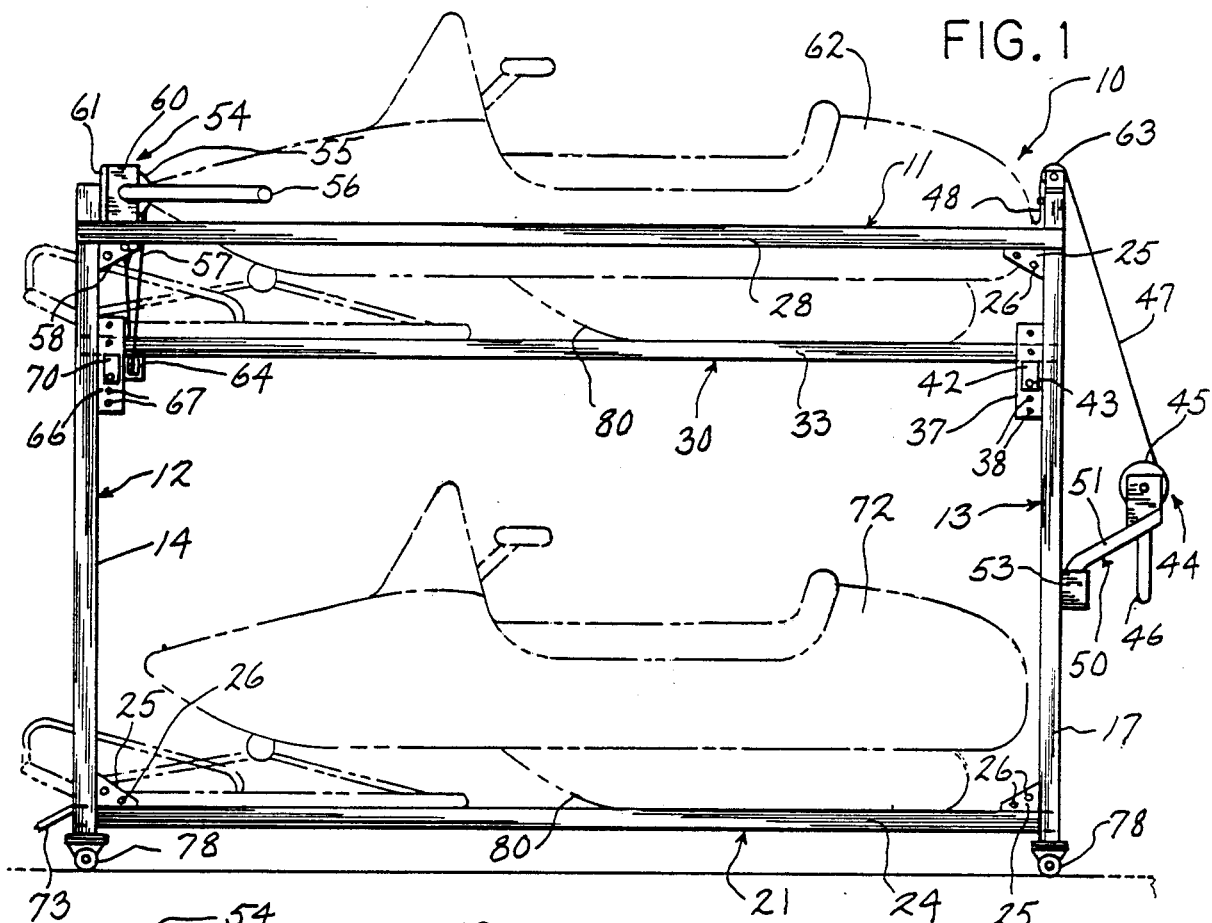
FIG. 1 is a side elevation of the two-tier storage rack of the present invention showing, in phantom, two snowmobiles stored thereon.
Figure 2:
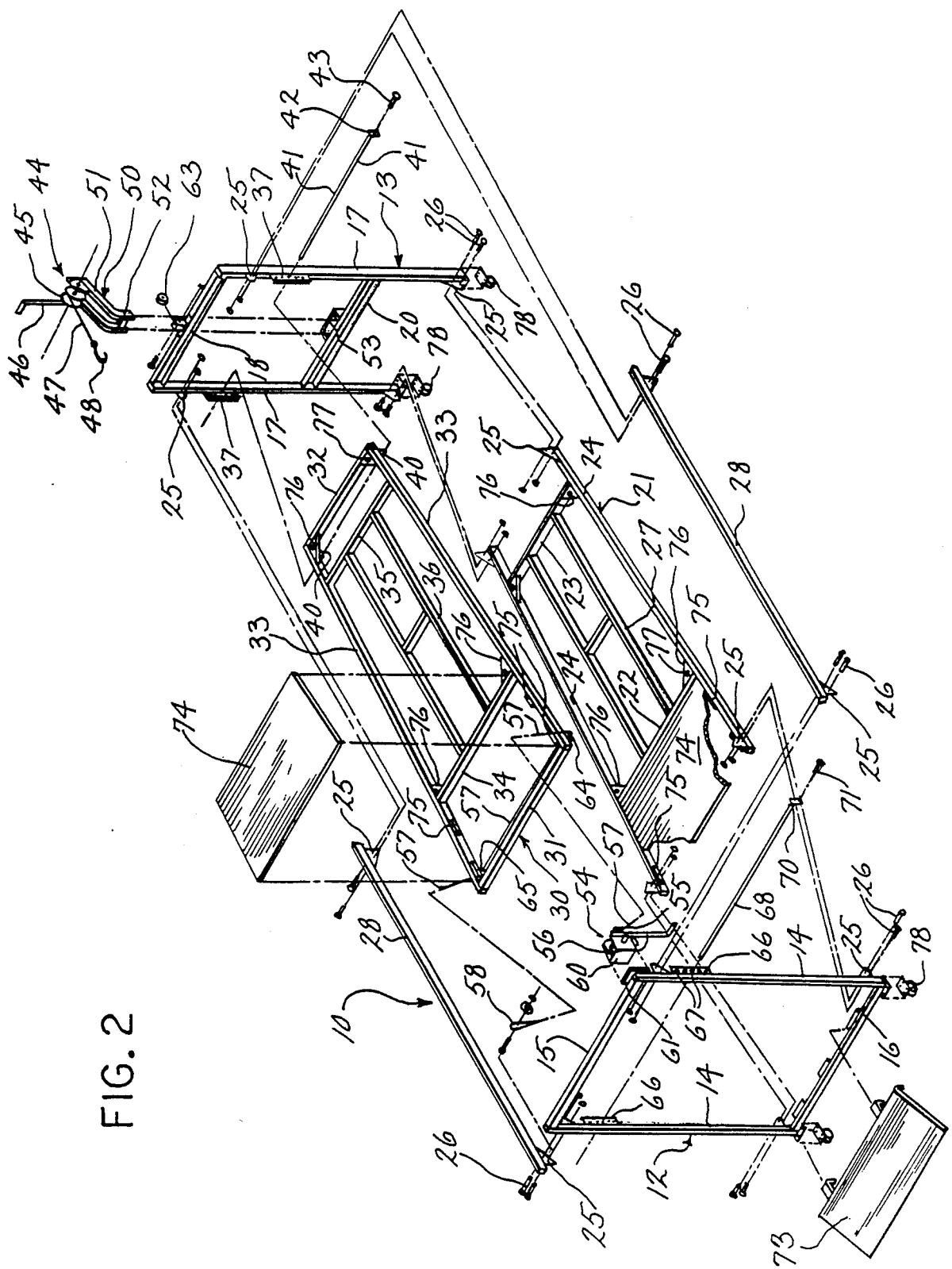
FIG. 2 is an exploded perspective view of the storage rack shown in FIG. 1.

Referring first to FIGS. 1 and 2, a storage rack 10 of the present invention comprises a generally open rectangular framework 11 which includes vertically disposed front and rear frame members 12 and 13, respectively. The front frame member 12 includes a pair of spaced vertical legs 14 interconnected by upper and lower cross members 15 and 16, respectively. The rear frame member 13 also includes a pair of vertical legs 17 interconnected by an upper cross member 18 and an intermediate cross member 20. The front and rear frame members 12 and 13 are connected by a lower horizontal frame member 21. Horizontal frame member 21 includes a front cross member 22 and a rear cross member 23 interconnected at their ends by a pair of side members 24. Each of the side members 24 extends forwardly and rearwardly of the cross members 22 and 23 to a rigid connection at its ends to the lower ends of a pair of front and rear vertical legs 14 and 17, respectively. Each of the connections between the end of a side member 24 and the lower end of a vertical leg 14 or 17 is preferably provided by interconnecting a pair of brackets 25 rigidly attached to said ends with a pair of bolts 26. To provide rigidity to the lower horizontal frame member 21 and the necessary support for the vehicle to be positioned thereon, the front and rear cross members 22 and 23 are interconnected by an H-frame member 27.

The storage rack framework 11 is completed with a pair of upper side rails 28, each attached by its ends to the upper ends of a front and rear vertical leg 14 and 17, respectively, of the front and rear frame members 12 and 13. The connections between the side rails 28 and the vertical legs 14 and 17 may comprise an arrangement similar to that previously described, namely a pair of brackets 25 rigidly attached to the members and interconnected by a pair of bolts 26.

Positioned within the framework 11 and overlying the lower horizontal frame member 21 is an upper support platform 30. The platform 30 includes a front end member 31 and a rear end member 32 interconnected by a pair of side support members 33. The size and shape of the upper support platform 30 is generally the same as the lower frame member 21. The support platform 30 includes an interior supporting structure like the lower frame member, namely, front and rear cross members 34 and 35 interconnected by an H-frame member 36.

The upper vehicle support platform 30 is pivotally connected to the upper portion of the rear frame member 13. Each of the vertical legs 17 of the rear frame member 13 has attached thereto a pivot pin bracket 37, each having a series of vertically disposed pivot pin holes 38 for adjustable positioning of the pivotal connection. The rear ends of each of the side support members 33 is provided with a pivot bracket 40 positioned to fit within the pivot pin brackets 37 on the rear frame member 13 and to receive through aligned holes therein a pivot bar 41. To secure the pivot bar 41 in its selected position, one end thereof is provided with a mounting plate 42 through which a mounting bolt 43 extends and into an adjacent pivot pin hole 38 to secure the bar in position in the pivot pin brackets 37. With the forward edge of the upper support platform 30 unsupported, it is free to pivot downwardly about its pivotal connection on the pivot bar 41 until the front end member 31 rests on the forward ends of the side members 24 of the lower frame member 21. In this position, the upper vehicle support platform 30 is in its inclined loading position. Appropriate positioning apparatus is utilized to raise the forward edge of the vehicle support platform 30 (and any vehicle positioned thereon) to a generally horizontal upper storage position, as will be described in more detail hereinafter.

It should be noted that both the lower horizontal frame member 21 and upper vehicle support platform 30 are of a generally trapezoidal shape in plan view. Thus, with respect to the lower frame member 21, the front cross member 22 is longer than the rear cross member 23 such that the side members 24 converge rearwardly. Similarly, with respect to the upper vehicle support platform 30, the front end member 31 is longer than the rear end member 32 such that the side support members 33 also converge rearwardly. Correspondingly, the front frame member 12 is wider than the rear frame member 13. This trapezoidal configuration is particularly adapted to the shape of a conventional snowmobile such that the storage rack 10 occupies a minimum storage area.

To provide a means for loading and positioning snowmobiles or other small vehicles on the storage rack, a first winch 44 is attached to the rear frame member 13. The winch 44 is of a conventional construction, including a cable reel 45, crank 46 and a winch cable 47 having a hook 48 or other suitable connector on its free end. The winch 44 is attached to the generally horizontal leg 51 of an L-shaped mounting bracket 50. The vertical leg 52 of the mounting bracket 50 extends into a mounting bracket slot 53 centered on the intermediate cross member 20 of the rear frame member 13.

A second winch 54, of a construction similar to the first winch 44, is attached to the upper corner of the front frame member 12 at the interconnection between a vertical leg 14 and the upper cross member 15. The second winch 54 includes a conventional reel 55, crank 56, and cable 57 with a loop 58 or other suitable connector on its free end. The winch 54 is mounted on a supporting bracket 60 which, in turn, is bolted to a mounting plate 61 secured, as by welding, to the front frame member 12. The second winch 54 is utilized to raise the upper vehicle support platform 30 from its inclined loading positioning to its generally horizontal storage position. The first winch 44 is utilized to pull a first vehicle onto the upper support platform 30 and a second vehicle onto the lower horizontal frame member 21.

Figure 3:
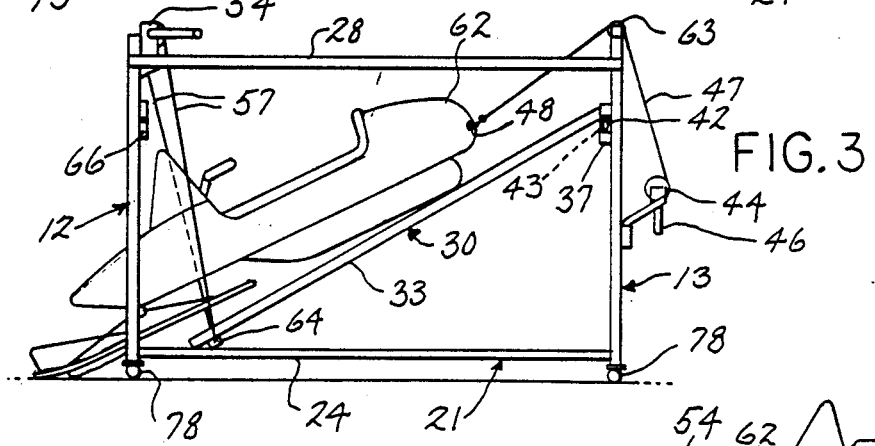
FIGS. 3 and 4 are schematic side views of the storage rack showing its sequence of operation for loading and storing two snowmobiles.
Figure 4:
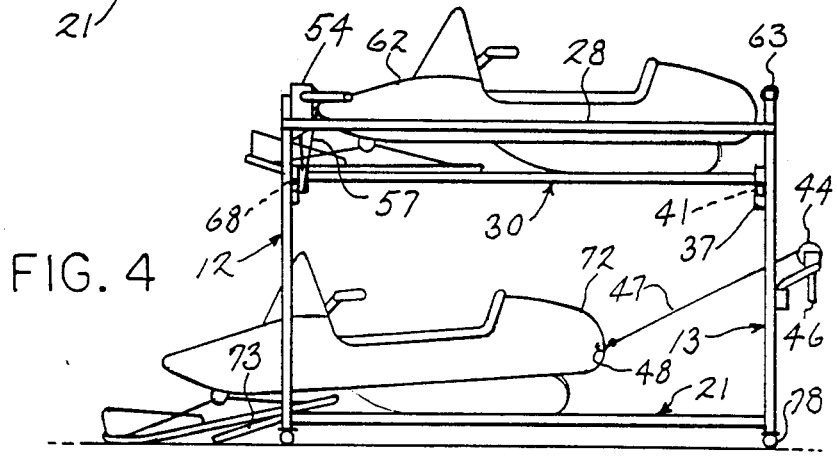

To load and position vehicles on the storage rack 10 and referring also to FIGS. 3 and 4, with the upper vehicle support platform 30 in its inclined loading position with the front cross member 34 supported on the side members 24 of the lower horizontal frame member 21, the rack 10 is moved into a position with the front frame member 12 adjacent the rear of a first snowmobile 62 standing on the floor. The first winch cable 47 is pulled upwardly from the reel 45 over a first pulley 63 attached to the upper cross member 18 of the rear frame member 13. The cable hook 48 is attached to the rear of the first snowmobile 62 and the crank 46 is manually operated to pull the first snowmobile through the front frame member 12 and onto the inclined upper vehicle support platform 30.

The cable 57 of the second winch 54 is played out from the reel 55 downwardly around a second pulley 64 mounted on the forward end of the side support member 33 of the vehicle support platform 30, across the underside of the platform, around a third pulley 65 mounted on the forward end of the other side support member 33, and upwardly along the vertical leg 14 of the front frame member 12 where the loop end 58 is attached to the upper end of said vertical leg 14. Operation of the second winch to reel in the cable 57 causes the forward edge of the upper support platform 30 to be raised vertically about the rear pivot bar 41, carrying with it the first snowmobile 62 positioned thereon. This support platform 30 may be raised to any desired position adequate to make the snowmobile accessible for service or repair, or high enough to allow a second snowmobile to be positioned under it. Preferably, the upper vehicle support platform 30 is raised until the front end member 31 is disposed between a pair of locking brackets 66 attached to the upper ends of the vertical legs 14. Each locking bracket 66 is similar to and positioned at approximately the same height as the rear pivot pin brackets 37 and includes a series of holes 67 for receipt therethrough of a locking bar 68. The locking bar 68 may be essentially identical to the pivot bar 41, but is adapted to be inserted through aligned holes 67 in the opposite locking brackets 66 to extend below the forward ends of the side support members 33 of the support platform 30 to securely hold the platform and the first snowmobile in the upper storage position. The locking bar includes an integral mounting plate 70 attached to one end through which a mounting bolt 71 may be extended into one of the locking bracket holes 67 to hold the locking bar in supporting position and prevent its inadvertent dislodgement.

With the upper vehicle support platform and first snowmobile locked in the upper storage position, the first winch cable 47 is removed from engagement with the first pulley 63 and the cable is extended directly from the reel to the rear end of a second snowmobile 72 positioned at the forward end of the storage rack. The cable 47 is manually retrieved by turning the crank 46 and the attached second snowmobile is pulled through the front frame member 12 and onto the lower horizontal frame member 21 until it is fully supported thereon.

To facilitate loading of the snowmobiles onto the upper support platform and the lower horizontal frame member, a demountable ramp 73 may be attached to the lower cross member 16 of the front frame member 12. The ramp may be provided with any convenient attachment means for allowing one edge to be hooked over the cross member 16 to prevent it from being displaced as the snowmobiles are pulled up and over the ramp.

Both the lower horizontal frame member 21 and the upper vehicle support platform 30 may be provided with forward floor panels 74 which may be of identical construction. Thus, the lower frame member 21 is provided with a pair of support lips 75 attached to the inside surfaces on the forward ends of the side members 24 forward of the front cross member 22. The lips support the floor panel 74 which, in turn, provides additional support for the skis of the first snowmobile 62 or for the wheels of some other type of vehicle which may be stored on the rack of this invention. Similarly, the upper support platform 30 is provided with two pairs of support lips 75 attached to the inside faces of the side support members 33 between the front end member 31 and the front cross member 34. The demountable floor panel 74 is supported therein in a similar manner. The generally open framework defining the remainders of both the lower frame member 21 and upper support platform 30 are generally adequate to support the relatively wide drive belt 80 at the rear of the snowmobiles. Thus, no additional floor panels are typically necessary. However, if the storage rack is utilized to store wheeled vehicles, such as all terrain vehicles, additional floor panels are required. Thus, the lower frame member and the upper support platform may be provided with a series of corner gussets 76, each of which may be provided with a suitable mounting hole 77. An appropriately shaped floor panel (not shown) may be placed over the remaining open frame portion of the lower member 21 and upper platform 30 and secured in position with suitable bolts or other fasteners extending through the panels and mounting holes 77 in the gussets 76.

Conventional locking casters 78 are preferably attached to the lower ends of each pair of vertical legs 14 and 17. The casters allow the storage rack to be conveniently positioned immediately adjacent the rear of each snowmobile to be loaded thereon and to allow the storage rack to be easily moved about in a storage area when empty or loaded. As previously described, the major components of the storage rack are all interconnected with bolted connections such that the entire rack may be shipped in a knocked down space-saving configuration and easily assembled on sight.

It is also possible to operate the storage rack with a single winch. In this case, preferably the rear or first winch 44 would be utilized. The second winch 54 could be replaced with a pulley similar to one of the pulleys 63–65 and the first winch cable 47 strung over the first pulley 63, the replacement pulley (not shown) and downwardly around the second and third pulleys 64 and 65, and attached by its hooked end 48 to the front frame member 12 in the same manner previously described with respect to the second winch cable.

Various modes of carrying out the present invention are contemplated as being within the scope of the following claims particularly pointing out and distinctly claiming the subject matter which is regarded as the invention.

I claim:

1. A two-tier storage rack for vehicles comprising:
a generally rectangular open framework, including a lower horizontal frame member and a pair of spaced vertical rear legs and a pair of spaced vertical forward legs, each of said legs being attached to and extending upwardly from said horizontal lower frame member each of said legs having an upper portion;
an upper vehicle support platform overlying said horizontal frame member and having a pivotal connection at one end to the upper portion of the rear legs, such that said platform may be pivoted between an inclined loading position with its other end adjacent one end of the lower frame member and an upper storage position with said other end raised to the upper portion of said forward legs;
said pivotal connection including a series of vertically spaced pivot holes on the upper portion of each rear leg, the pivot holes in each rear leg disposed in horizontal alignment with the pivot holes in the other rear leg, and a pivot bar demountably insertable through said one end of the upper vehicle support platform and a pair of aligned pivot holes in said rear legs to selectively establish the vertical position of said pivotal connection; and, positioning means operatively attached to said framework for pulling a first vehicle onto said upper support platform in the loading position, for raising said other end of said upper support platform and a first vehicle thereon to the storage position, and for pulling a second vehicle onto said lower horizontal frame member beneath said support platform.

2. The apparatus as set forth in claim 1 wherein said positioning means comprises winch means demountably attachable in sequence to one end of said first vehicle, the other end of said upper support platform, and one end of said second vehicle.

3. The apparatus as set forth in claim 2 wherein said winch means comprises:
a first winch having a winch cable attachable by its free end to said one ends of said first and second vehicles; and,
a second winch having a winch cable attachable by its free end to said other end of said upper support platform.

4. The apparatus as set forth in claim 3 wherein said winches are manually operable.

5. The apparatus as set forth in claim 3 further comprising a plurality of wheels attached to the bottom of said framework to support the rack for movement and positioning on a floor.

6. A two-tier storage rack for vehicles comprising:
an open generally rectangular framework including vertically disposed front and rear frame members each of said frame members having an upper portion, a lower horizontal frame member interconnecting the lower ends of the front and rear frame members, and a pair of upper horizontal side frame members interconnecting the upper ends of the front and rear frame members;
an upper vehicle support platform including horizontal front and rear edges having a vertically adjustable pivotal connection to the upper portion of the rear frame member, said pivotal connection including a set of vertically spaced and horizontally aligned pivot holes on opposite sides of the rear frame member, and a pivot bar demountably insertable through the horizontal rear edge of said upper vehicle support platform and a pair of opposite aligned pivot holes to selectively establish the vertical position of said pivotal connection, said platform disposed to pivot within the framework between an inclined loading position with its horizontal front edge adjacent the lower end of the front frame member and a generally horizontal storage position with said horizontal front edge adjacent the upper portion of the front frame member; and,
positioning means attached to said framework for pulling a vehicle onto said upper support platform in the loading position and for raising said front edge of said upper support platform and the vehicle thereon about the pivotal connection to the storage position.

7. The apparatus as set forth in claim 6 wherein said positioning means is further operative for pulling a second vehicle onto said lower horizontal frame member beneath said upper support platform in the storage position.

8. The apparatus as set forth in claim 7 wherein said positioning means comprises:
a first winch attached to said rear frame member and having a winch cable with a free end demountably attachable to one end of each of said vehicles; and,
a second winch attached to said front frame member and having a winch cable operatively attached to the front edge of said upper vehicle support platform.

9. The apparatus as set forth in claim 8 wherein said first winch is attached below said pivotal connection and further comprising a first pulley attached to said rear frame member above said pivotal connection to support said first winch cable for pulling said vehicle onto said upper support platform.

10. The apparatus as set forth in claim 8 wherein said second winch is attached to the upper portion of said first frame member and further comprising second pulley means attached to the front edge of said upper vehicle support platform for supporting said second winch cable to raise said platform to said storage position.

11. The apparatus as set forth in claim 10 wherein said second pulley means comprises second and third pulleys attached to opposite ends of said front edge of said support platform, and wherein said second winch is attached to one side of the upper portion of said front frame member, and said second winch cable extends around said second and third pulleys and is attached at its free end to the other side of the upper portion of said front frame member.

12. The apparatus as set forth in claim 6 including locking means for securing said upper support platform in the storage position.

13. The apparatus as set forth in claim 12 wherein said locking means comprises a locking bar adjustably attached to said front frame member and extending under the forward end of said support platform.

14. The apparatus as set forth in claim 13 wherein the attachment of said locking bar to said front frame member is vertically adjustable.

15. The apparatus as set forth in claim 8 including:
a series of vertically spaced, and horizontally aligned locking holes on opposite sides of the vertical front frame member; and,
a locking bar demountably insertable under the horizontal front edge of said upper vehicle support platform and through a pair of opposite aligned locking holes to lock the front edge in a selected vertical position.

16. The apparatus as set forth in claim 6 wherein said generally rectangular framework is trapezoidal in plan view such that the lower horizontal frame member and upper vehicle support platform both taper rearwardly.

* * * * *